J. A. PERKINS.
ROLLER BEARING.
APPLICATION FILED MAR. 22, 1906.
1,066,752.  Patented July 8, 1913.
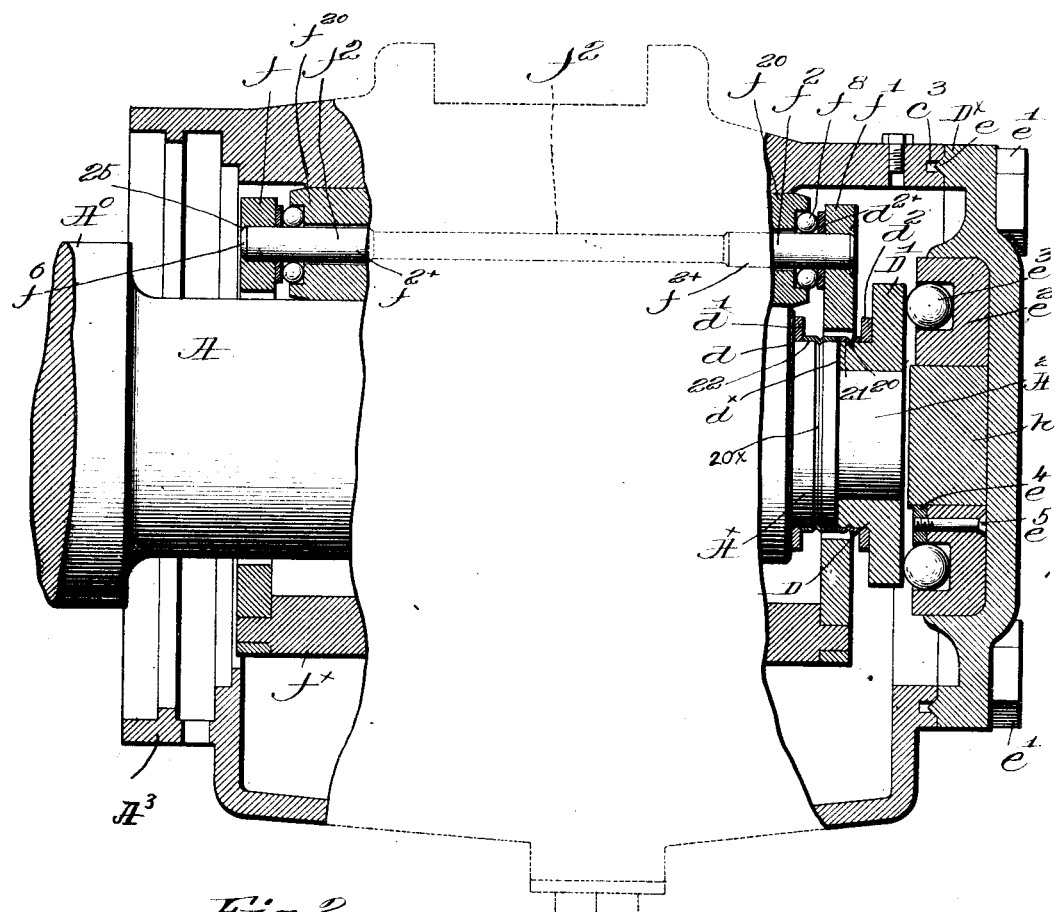
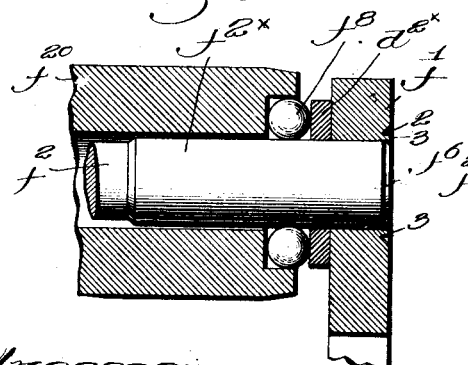

UNITED STATES PATENT OFFICE.

JULIUS A. PERKINS, OF OMAHA, NEBRASKA, ASSIGNOR, BY MESNE ASSIGNMENTS, TO UNITED STATES ROLLER BEARING COMPANY, OF JERSEY CITY, NEW JERSEY, A CORPORATION OF NEW JERSEY.

ROLLER-BEARING.

1,066,752.

Specification of Letters Patent.

Patented July 8, 1913.

Original application filed August 14, 1903, Serial No. 169,500. Divided and this application filed March 22, 1906. Serial No. 307,523.

*To all whom it may concern:*

Be it known that I, JULIUS A. PERKINS, a citizen of the United States, and resident of Omaha, county of Douglas, State of Nebraska, have invented an Improvement in Roller-Bearings, of which the following description, in connection with the accompanying drawing, is a specification, like letters on the drawings representing like parts.

This invention has for its aim to improve, strengthen and simplify the construction of roller bearings of the class shown in United States Patent No. 664820, dated December 25, 1900.

Herein I have aimed to bring the bearing-rollers as closely as possible to the car-wheel which is fixed to the axle and as near as practicable to the shaft-collar. To enable this to be done I have made the outer ring of the roller-carrying-cage wider so that a part thereof extends inwardly far enough to overlap the periphery of the bearing-rollers and preferably overlap a shoulder of the shaft from which extends the tenon on which is applied a cage controller, the radial flange of said controller occupying a position somewhat removed from the shoulder of the journal. The inner edge of the outer ring of the cage enters loosely a space outside the shoulder of the journal, at opposite sides of which are located indestructible washers preferably of hard fiber the distance between the faces of the washers being in excess of the thickness of the end-ring of the cage, so that the cage is permitted to float on the journal and may be arrested in its to-and-fro movements by one or the other of the washers. In this way the cage-controller co-acts with one end of the cage, and the hub of the cage-controller fitting the tenon, enters the cage.

Figure 1 shows part of a car axle in elevation with a box, roller cage and co-acting parts in longitudinal section, the dust guard being omitted; Fig. 2 is an enlarged detail to be referred to, and Fig. 3 shows one end of a spindle with its enlargement.

Referring to the drawing, A represents one of the journals of a car-axle $A^o$, having a reduced portion $A^x$ and a tenon $A^2$. The box is closed at its outer end by a cap $D^x$ shown as having a tapered tongue $e$ that contacts with any usual packing placed in an annular chamber $c^3$ in the end of the box, the cap being held in place by suitable bolts $e'$ entering screw-threaded portions of the box. The interior of the cap has a recess that receives a ring $e^2$ provided in its face with an annular groove next the end of the journal, said groove being made at a distance from the periphery of said ring and receiving a series of balls $e^3$ that serve to arrest and prevent wear due to end-thrust. The groove in the ring $e^2$ has a gate $e^4$ held in operative position by a screw $e^5$ and by taking out this screw and removing the gate, the balls $e^3$ may be inserted in the groove, the shape of the groove being such that the balls can not be removed therefrom except through the gate. The tenon at the end of the journal has applied to it a cage controller D having a radial flange $D'$. The inner end of the controller substantially abuts the shoulder $d^x$ of the reduced part $A^x$ of the journal. The shoulder $d$ of the journal, as well as the inner side of the radial flange $D'$ of the cage controller D, each sustain an anti-friction washer $d'$, $d^2$, which may be of hard-fiber or equivalent material.

The cage carrying the bearing-rollers $f^{20}$ is composed of two end rings $f$, $f'$, united rigidly by bars $f^x$, or in any usual manner. The outer-ring $f'$ is represented as wider than the inner-ring, the inner edge of the outer-ring overlapping, as shown, the ends of the bearing-rollers $f^{20}$ surrounding spindles $f^2$ held in the cage-ends, as will be described, said outer-ring also overlapping as shown the shoulder $d$ of the journal. The outer-ring enters loosely the space between the washers $d'$ and $d^2$, and has a freedom of movement therein sufficient to provide for the flotation of the cage between the journal and the box.

In the patent referred to, the journal carried two cage controllers one at each end, said cage controllers co-acting with opposite ends of the cage, but herein in order to enable the bearing-rollers to be brought closer to the car-wheel which will be secured upon the shaft as closely as practicable to the collar $A^3$ surrounding the same, I have provided for controlling the extent of flotation of the cage from the outer end thereof.

The washers $d'$, $d^2$ receive the blows of the cage in its rotation with the journal, and are retained in place on the reduced portion $A^x$ of the journal and on the flange D' of the detachable controller D in the following manner:—The periphery of the shank of the controller has a slight annular groove 20, and after the washer $d^2$ has been put in position a thin brass or soft metal sleeve 21 is placed over the reduced part of the controller, and with a tool the sleeve is acted upon opposite the groove, forcing the metal of the sleeve into the groove and thus fastening the sleeve to the controller. The reduced part $A^x$ of the journal is also grooved in like manner at $20^x$ and receives a sleeve which is secured in place as described of sleeve 21, it retaining the washer $d'$ in its operative position said sleeve having flat portions 22 at each side of the groove $20^x$. By securing this washer in position as shown it is possible to take the cage controller D and the cage from the journal, the controller and washer $d^2$ being prevented from separating during the inspection of the cage and spindles.

In the production of a bearing it is absolutely necessary when constructing the same for practical use to also provide for any possible accident, no matter how remote, that might happen and might render the bearing worthless when a car is on a trip, it being understood that in case a bearing should become inoperative it must be either renewed immediately or else the car containing it must be set off a train. With this idea of excessive safety I have enlarged the ends $f^{2x}$ of the spindles on which the anti-friction balls travel, have hardened said enlarged ends, and have made said enlarged ends of sufficient length to enter for a distance within the bores made through the centers of the bearing rollers $f^{20}$, and I have so finished the exteriors of the enlarged parts of the spindles and the interiors of the bores near the chambers containing the balls $f^3$, and have made the diameters of the enlargements and the diameters of the bores so that the enlarged part of the spindle nearly touches the finished portions of the bores.

In use if the balls and flanges of the rolls remain intact as is expected of them, the bearing will remain intact and continue operative, but in case of an unforeseen accident or fault, say for instance, in a ball or in a flange, any particular bearing roller should become inoperative, were it not for the enlargement of the spindle and its close proximity to the interior of the bore, the bearing if running at speed would be destroyed, owing to the non-alinement of that particular bearing-roller with relation to the others. In the construction herein shown, in case the anti-friction means sustaining a bearing-roller on the spindle becomes for any reason inoperative, then the roller will take frictional bearing instantly upon the enlarged part of the spindle, and this bearing will be sufficiently durable to permit a car to complete any customary trip.

The spindles $f^2$ have their opposite ends tapered or beveled somewhat as at $f^6$, and they are inserted in the cage in a novel manner.

It is very desirable to be able to inspect the spindles without destroying the cages, and to do this I first drill in the opposite end rings of the cage, holes exactly in alinement, said holes being a little smaller than the diameter of the enlarged ends of the spindles. I next with another and larger reamer ream out the holes at one end of the cage to the diameter of the enlarged ends of the spindle, and pass the reamer into the hole at the opposite end of the cage from the inner side thereof far enough to leave a tapering abutment 25 in that cage-end against which may take seat the beveled end of the spindle first to be inserted in the cage, as for instance the left hand end of the spindle shown in Fig. 1. Outside the hole drilled through the opposite end of the cage I cut an annular groove 2, see Fig. 2, leaving a flange 3, and when the spindle has been inserted and the opposite end has taken seat in the opposite flange, with a suitable tool I turn over the flange 3 onto the beveled end of the spindle, as shown in Fig. 1. This locks the spindles firmly against either longitudinal or rotary movement in the cage-end. To inspect the spindle the cage will be withdrawn from between the journal and box, and with a punch or other appliance the inner end of the spindle will be acted upon directly, and the spindle will be forced longitudinally from the cage, the beveled end of the spindle in contact with the inturned flange 3 acting to straighten out said flange and permit the spindle passing out of the cage.

Preferably the cage ends are made of boiler plate, the metal of which will stand the operation described for many times.

Again, with reference to excessive safety and provisions for compensating for any fault, for instance, of the end-thrust means due to the cutting of the balls $e^3$ into, say, the face of the controller, or into the groove in which the balls travel, I have provided the bearing with an auxiliary frictional end-thrust device herein represented as a block or disk $h$ preferably of brass, and as I have herein chosen to illustrate this auxiliary frictional end-thrust device, it is located centrally in the end-thrust ring $e^2$, and the face of the disk projects a little to the left, Fig. 1, beyond the face of said ring. Now, in case the balls $e^3$ should, due to carelessness in hardening, cut into the face of the controller flange D', or into the groove in which the balls run, or for any reason the end-thrust means should become inoperative, the end of the controller flange D' and the end of the tenon, or either, may contact with the disk $h$ so that the latter will constitute a frictional end-thrust device. Preferably the disk will be so applied that it may revolve under the action of the journal.

Having fully described my invention, what I claim as new and desire to secure by Letters Patent is:—

1. In a roller-bearing, a journal, a box, and a floating-cage, a series of bearing-rollers mounted in the cage, the outer-end ring of said cage being wider than the inner-end ring thereof, and a cage-controller located near the outer-end of said journal and engaging only the outer-ring of the cage.

2. In a roller-bearing, a journal having a tenon at its end and presenting a shoulder at the junction of the tenon and journal, a controller, a plurality of washers, a cage, and bearing rollers contained therein, the outer end of the cage being of a width to enter loosely the space between said washers to provide for floating of the cage.

3. In a roller-bearing, an axle having a reduced portion and a tenon, a washer surrounding said reduced portion, and means to secure said washer to said reduced portion, a cage controller surrounding said tenon, a washer fitted to said controller, and means to maintain said washer on said controller.

In testimony whereof, I have signed my name to this specification, in the presence of two subscribing witnesses.

JULIUS A. PERKINS.

Witnesses:
A. L. NORMAN,
THOMAS B. MCCREADY.